E. D. FERRELL.
PUSH BUTTON ATTACHMENT FOR STEERING POSTS.
APPLICATION FILED JAN. 22, 1917.
1,303,188. Patented May 6, 1919.
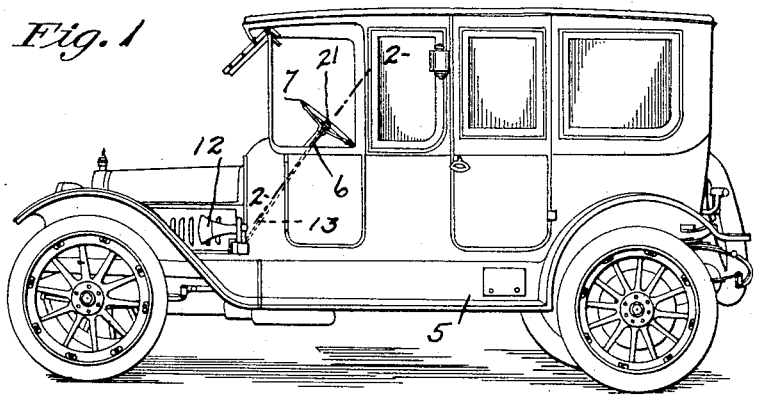
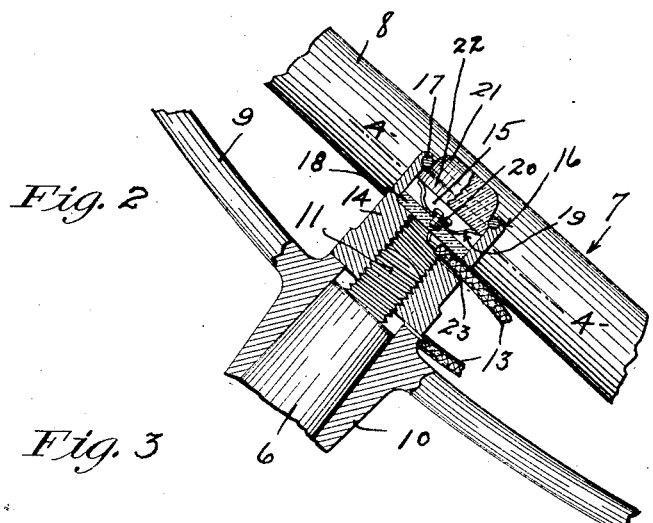
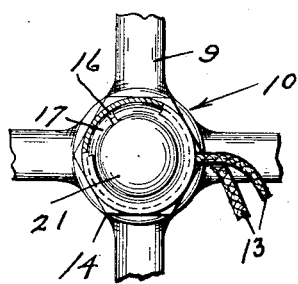
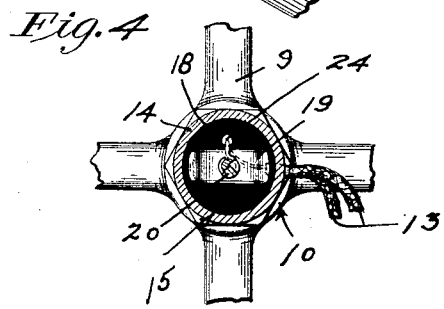
Witnesses
E. C. Wells
A. H. Opsahl
Inventor
EUGENE D. FERRELL
By his Attorneys
Williamson & Merchant

UNITED STATES PATENT OFFICE.

EUGENE D. FERRELL, OF WAYZATA, MINNESOTA.

PUSH-BUTTON ATTACHMENT FOR STEERING-POSTS.

1,303,188.  Specification of Letters Patent.  Patented May 6, 1919.

Application filed January 22, 1917. Serial No. 143,556.

*To all whom it may concern:*

Be it known that I, EUGENE D. FERRELL, a citizen of the United States, residing at Wayzata, in the county of Hennepin and State of Minnesota, have invented certain new and useful Improvements in Push-Button Attachments for Steering-Posts; and I do hereby declare the following to be a full, clear, and exact description of the invention, such as will enable others skilled in the art to which it appertains to make and use the same.

My invention has for its object to provide a separate and efficient push-button attachment for the electrical circuit connections of electromagnetically operated horns or sound producing alarm devices for automobiles and which push-button and the circuit connections thereto and therefrom are adapted to be readily applied to the standard steering equipment of automobiles, which do not primarily have the push-button located at the hub of the steering wheel.

To the above end, generally stated, the invention consists of the novel devices and combinations of devices hereinafter described and defined in the claim.

In the accompanying drawings, which illustrate the invention, like characters indicate like parts throughout the several views.

Referring to the drawings,

Figure 1 is a perspective view of an automobile having the invention applied thereto;

Fig. 2 is a fragmentary detail view with some parts sectioned on the line 2—2 of Fig. 1, on an enlarged scale;

Fig. 3 is a plan view of the parts shown in Fig. 2; and

Fig. 4 is a horizontal section taken on the line 4—4 of Fig. 2.

The numeral 5 indicates, as an entirety, an automobile, with the exception of the steering post 6 and steering wheel 7. The rim, spider bracket and hub of the steering wheel are indicated, respectively, by the numerals 8, 9 and 10. On the upper end of the steering post 6, is the customary screw-threaded shank 11 and the hub 10 has a tapered fit with the upper end of the steering post 6. The numeral 12 indicates, as an entirety, an electromagnetically operated sound-producing device, with the exception of the two main wires 13 of its electrical connections. The parts, thus far described, may be of the standard, or any desired construction.

Referring now to the push-button attachment, the numeral 14 indicates a wheel nut adapted to be screwed onto the shank 11 of the steering post 6. This wheel nut 14 is for holding the steering wheel 7 against axial displacement from the steering post 6 and for forcing the hub thereof into its tapered engagement with said steering post. In the upper end of the wheel nut 14, is a socket 15 having a diameter considerably larger than the axial screw-threaded opening in said nut. Formed in the inner wall of the socket 15, close to the outer end of the nut 14, is an annular groove 16, within which is mounted a transversely divided spring-retaining ring 17, the purpose of which will presently appear.

Within the socket 15 and resting on the bottom thereof, is a disk 18 of insulating material. Secured to the upper face of the disk 18 by a terminal screw 20, is a pair of oppositely projecting spring contact fingers 19 normally out of contact with the internal wall of the socket 15. Loosely resting on the contact fingers 19, is a push-button 21, of suitable insulating material, and having a base flange 22, which closely fits the internal walls of the socket 15. The body of this push-button 21 closely fits within the retaining ring 17, with freedom for endwise movement into and out of the socket 15. This retaining ring 17 engages the base flange 22 of the push-button 21 and holds the same in the socket 15. The upper extremity of the push-button 21 is rounded and, by depressing the same, the retaining ring 17 may be contracted and removed from the groove 16. With the retaining ring 17 removed from the wheel nut 14, the push-button 21, disk 18 and contact fingers 19, may be removed from the socket 15.

The outer end of one of the main wires 13 is grounded through the steering post 6 and, as shown, is held in position by clamping the same between the hub 10 and wheel nut 14. The other wire 13 has its outer end inserted through a bore 23 in one side of the wheel nut 14, through a hole 24 in the disk 18 and secured to the terminal screw 20. These main wires 13 extend from the sound-producing device 12 upward along the outside of the steering post 6, between the arms of the spider bracket 9 and to their respective terminals.

From the above description, it will be seen that by removing the standard wheel nut of an automobile and replacing the same with the wheel nut 14, within which the present invention is incorporated, the attachment may be very quickly applied to an automobile.

What I claim is:—

The combination with a steering post having a steering wheel, of a nut securing the steering wheel to said post, said nut having a socket, a push-button mounted in said socket, an insulating disk seated in the socket below the push-button, a spring contact secured to said disk, normally out of contact with the nut and yieldingly supporting the push-button, and lead wires attached, the one to the nut and the other to the contact, said contact arranged to be moved into engagement with the nut by the depression of the push-button to close the circuit through the lead wires.

In testimony whereof I affix my signature in presence of two witnesses.

EUGENE D. FERRELL.

Witnesses:
CLARA DEMAREST,
HARRY D. KILGORE.

Copies of this patent may be obtained for five cents each, by addressing the "Commissioner of Patents, Washington, D. C."